G. F. LAMPKIN.
Improvement in Animal-Traps.

No. 128,802.              Patented July 9, 1872.

Witnesses:          Inventor:
Chas. Nida.          George F. Lampkin,
W. A. Graham.       PER   Munn & Co
                                      Attorneys.

UNITED STATES PATENT OFFICE.

GEORGE F. LAMPKIN, OF GEORGETOWN, KENTUCKY, ASSIGNOR TO HIMSELF AND JAMES Y. KELLEY, OF SAME PLACE.

IMPROVEMENT IN ANIMAL-TRAPS.

Specification forming part of Letters Patent No. 128,802, dated July, 9, 1872.

Specification describing a new and useful Improvement in Animal - Trap, invented by GEORGE F. LAMPKIN, of Georgetown, in the county of Scott and State of Kentucky.

Figure 1:
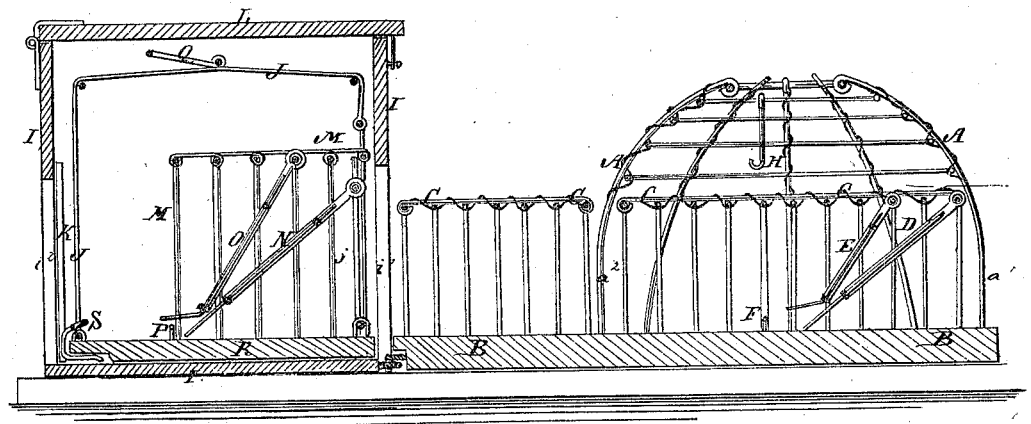
Figure 2:
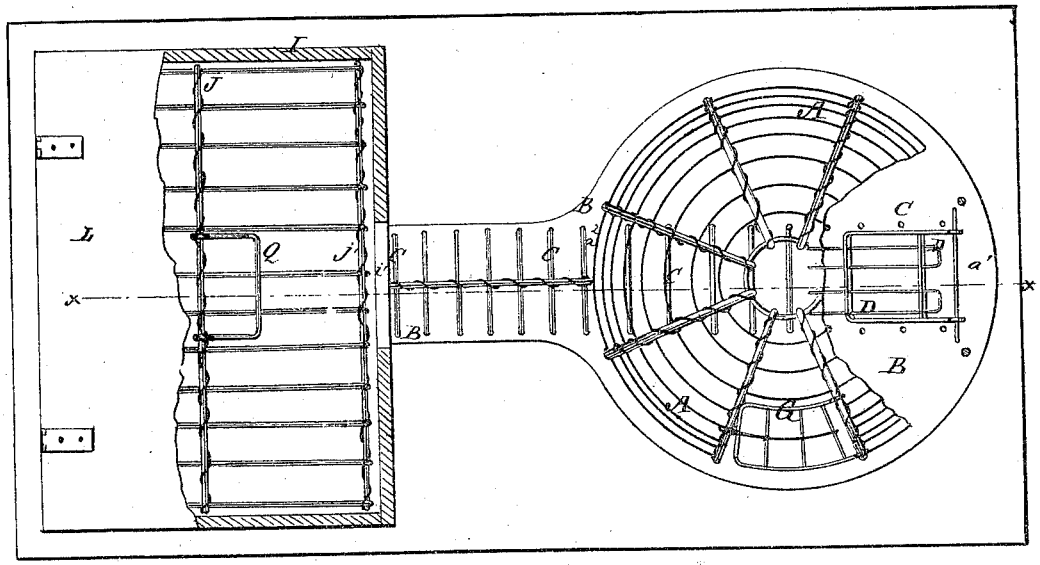

In the accompanying drawing, Figure 1 is a detail vertical longitudinal section of my improved trap, taken through the line $x$ $x$, Fig. 2. Fig. 2 is a top view of the same, parts being broken away to show the construction.

Similar letters of reference indicate corresponding parts.

My invention has for its object to furnish an improved trap for catching rats and other animals, which shall be simple in construction, convenient in use, and effective in operation, being so constructed as to catch any number of animals without frightening the others, or leaving any scent in the trap to warn them of danger; and it consists in the construction and combination of various parts of the trap, as hereinafter more fully described.

A represents an ordinary round wire trap, which is made and attached to the platform B in the ordinary manner, except that the hole in the top of the trap is closed. In one side of the trap A is formed an entrance-opening, $a^1$, and upon the opposite side an exit-opening, $a^2$. C is a wire passage-way extending across the trap A from the entrance-opening $a^1$ to the exit-opening $a^2$, and extending beyond said exit-opening $a^2$, as shown in Figs. 1 and 2. The passage-way C is made of such a size that the animal trapped for may pass through it freely, but cannot turn around in it, so that when he has once entered he can only pass along through said passage-way. At the entrance-opening $a^1$ is suspended a wire gate, D, which is made longer than the height of the passage-way C, so that its lower end may rest upon the platform B within the said passage-way C. A little in front of the gate D is suspended a guard, E, which is made similar to the gate D, but a little shorter, so that its lower end may rest upon or near the lower end of the gate D. The lower ends of the longitudinal wires of the guard E are made pointed and are bent upward somewhat, so as to prick the animal should he attempt to escape. The difficulty of raising the guard E and door D is increased by a wire, F, extended across the passage-way C just in front of the lower ends of the gate and guard D E, and which is raised a little above the platform B. In the side of the trap A is formed a third opening, closed with a door, G, for convenience in putting in bait, which is hung upon hooks H in different parts of the trap A and scattered about the platform B. The bait can thus never be reached by the animals, and will only require to be renewed occasionally. At the outer end of the passage-way C is placed a reception-room, consisting of an outer wooden box or case, I, and an inner wire cage, J. The case I is made with an opening, $i^1$, directly opposite the passage-way C, and with an opening, $i^2$, in its opposite side in front of the opening $i^1$, so that the animal when in the passage-way C may see light shining through the openings $i^1$ $i^2$, which will appear like a hole, and seem to afford a means of escape, causing him to hasten through the said passage-way C, so that he will remain but a very short time in the passage-way C, and thus will not scent the trap, as always happens when animals remain for any length of time in a trap, and which warns off other animals. The opening $i^2$ is closed with a glass plate, K. The case I is made with a hinged cover, L, which darkens the interior of the reception-room, and allows the wire cage J, and the animals that may be in it, to be conveniently taken out and the animals destroyed. The wire cage J is made with an opening, $j'$, in its side, directly opposite the opening $i^1$ in the case I and the passage-way C, from which opening a short passage-way, M, leads into the middle part of the cage J, and which is provided with a gate, N, guard O, and cross wire P, similar to the gate D, guard E, and wire F of the forward part of the passage C, and similarly arranged, so that the animals when once within the cage J cannot escape. The top of the cage J is provided with a handle, Q, for convenience in handling it. The bottom R of the cage J is hinged at one edge and secured at its other by means of a hook, S, or other convenient fastening, so that it may be conveniently opened to let out the animals when desired, either alive or after they have been killed.

Having thus described my invention, I claim as new and desire to secure by Letters Patent—

The reception-room consisting of the outer wooden case I L, and inner wire cage J M N O, constructed and arranged substantially as herein shown and described, and for the purpose set forth.

G. F. LAMPKIN.

Witnesses:
 JOHN E. SHENITT,
 JAMES N. RUCKER.